United States Patent
Brysch et al.

(10) Patent No.: US 6,687,353 B1
(45) Date of Patent: *Feb. 3, 2004

(54) SYSTEM AND METHOD FOR BRINGING AN IN-LINE DEVICE ON-LINE AND ASSUMING CONTROL OF CALLS

(75) Inventors: Michael Brysch, San Antonio, TX (US); Craig Heilmann, San Antonio, TX (US); Keith S. Pickens, San Antonio, TX (US); Robert R. Applonie, San Antonio, TX (US)

(73) Assignee: SecureLogix Corporation, San Antonio, TX (US)

( * ) Notice: Subject to any disclaimer, the term of this patent is extended or adjusted under 35 U.S.C. 154(b) by 536 days.

This patent is subject to a terminal disclaimer.

(21) Appl. No.: 09/672,530

(22) Filed: Sep. 28, 2000

Related U.S. Application Data

(63) Continuation-in-part of application No. 09/210,347, filed on Dec. 11, 1998, now Pat. No. 6,249,575.

(51) Int. Cl.7 ............................................. H04M 3/00
(52) U.S. Cl. ..................... 379/189; 379/196; 379/200
(58) Field of Search ........................ 379/93.24, 156, 379/157, 188, 189, 196, 200, 201.01, 88.01, 93.03, 93.11, 265.09; 713/201, 202, 153, 154

(56) References Cited

U.S. PATENT DOCUMENTS

| 4,332,982 A | 6/1982 | Thomas ..................... 179/7.1 |
| 4,639,557 A | 1/1987 | Butler et al. ................. 379/29 |
| 4,653,085 A | 3/1987 | Chan et al. ................... 379/94 |
| 4,783,796 A | 11/1988 | Ladd ........................... 379/67 |
| 4,876,717 A | 10/1989 | BarRon et al. ................ 380/25 |
| 4,905,281 A | 2/1990 | Surjaatmadja et al. ......... 380/25 |
| 4,965,459 A | 10/1990 | Murray ...................... 379/189 |
| 5,018,190 A | 5/1991 | Walker et al. ................ 379/95 |
| 5,276,529 A | 1/1994 | Williams .................... 358/406 |
| 5,276,687 A | 1/1994 | Miyamoto ............... 370/110.1 |
| 5,276,731 A | 1/1994 | Arbel et al. .................. 379/88 |

(List continued on next page.)

FOREIGN PATENT DOCUMENTS

| CA | 2094412 | 4/1993 |
| CA | 2221365 | 11/1997 |
| WO | WO 96/22000 | 7/1996 |
| WO | WO 98/17072 | 4/1998 |
| WO | WO 98/53635 | 11/1998 |

OTHER PUBLICATIONS http://www.tlogic.com/penetration.html.
http://www.m-tech.ab.ca/security/penetration.
http://www.m-tech.ab.ca/products/secmod/.
http://www.sandstorm.net/phonesweep:*Sandstorm* Enterprises, Inc. "Introducing PhoneSweep".
http://www.bruck-inc.com/html/security/pentesting.htm: "PenetrationTest".

*Primary Examiner*—Bing Bui
(74) *Attorney, Agent, or Firm*—Jenkens & Gilchrist, PC

(57) ABSTRACT

A telephony security system and method for controlling and logging access between an enterprise's end-user stations at a plurality of customer sites and their respective circuits into the public switched telephone network (PSTN). The system and method includes a discrete line sensor within the customer sites for determining a call type of the call, and taking actions on the call based on predetermined security rules.

17 Claims, 3 Drawing Sheets

U.S. PATENT DOCUMENTS

| | | | |
|---|---|---|---|
| 5,311,593 A | 5/1994 | Carmi | 380/23 |
| 5,345,595 A | 9/1994 | Johnson et al. | 455/33.1 |
| 5,351,287 A | 9/1994 | Bhattacharyya et al. | 379/95 |
| 5,436,957 A | 7/1995 | McConnell | 379/88 |
| 5,495,521 A | 2/1996 | Rangachar | 379/95 |
| 5,510,777 A | 4/1996 | Pilc et al. | 340/835.31 |
| 5,535,265 A | 7/1996 | Suwandhaputra | 379/97 |
| 5,557,742 A | 9/1996 | Smaha et al. | 395/186 |
| 5,581,228 A | 12/1996 | Cadieux et al. | |
| 5,606,604 A | 2/1997 | Rosenblatt et al. | 379/198 |
| 5,623,601 A | 4/1997 | Vu | 395/87.01 |
| 5,627,886 A | 5/1997 | Bowman | 379/111 |
| 5,684,957 A | 11/1997 | Kondo et al. | 395/200.06 |
| 5,706,338 A | 1/1998 | Relyea et al. | 379/189 |
| 5,745,555 A | 4/1998 | Mark | 379/95 |
| 5,805,686 A | 9/1998 | Moller et al. | 379/198 |
| 5,805,803 A | 9/1998 | Birrelle et al. | 395/187.01 |
| 5,812,763 A | 9/1998 | Teng | 395/187.01 |
| 5,826,014 A | 10/1998 | Coley et al. | 395/187.01 |
| 5,838,682 A | 11/1998 | Dekelbaum et al. | 370/401 |
| 5,854,889 A | 12/1998 | Liese et al. | 395/183.19 |
| 5,864,613 A | 1/1999 | Flood | 379/188 |
| 5,864,666 A | 1/1999 | Shrader | 395/187.01 |
| 5,892,903 A | 4/1999 | Klaus | 395/187.01 |
| 5,898,830 A | 4/1999 | Wesinger, Jr. et al. | 713/201 |
| 5,907,602 A | 5/1999 | Peel et al. | 379/114 |
| 5,918,019 A | 6/1999 | Valencia | 395/200.57 |
| 5,923,849 A | 7/1999 | Venkatraman | 395/200.54 |
| 5,931,946 A | 8/1999 | Terada et al. | 713/201 |
| 5,944,823 A | 8/1999 | Jade et al. | 713/201 |
| 5,946,386 A | 8/1999 | Rogers et al. | 379/265 |
| 5,949,864 A | 9/1999 | Cox | 379/189 |
| 5,950,195 A | 9/1999 | Stockwell et al. | 707/4 |
| 5,960,177 A | 9/1999 | Tanno | 709/229 |
| 6,061,798 A | 5/2000 | Coley et al. | 713/201 |
| 6,098,172 A | 8/2000 | Coss et al. | 713/201 |
| 6,154,775 A | 11/2000 | Coss et al. | 709/225 |

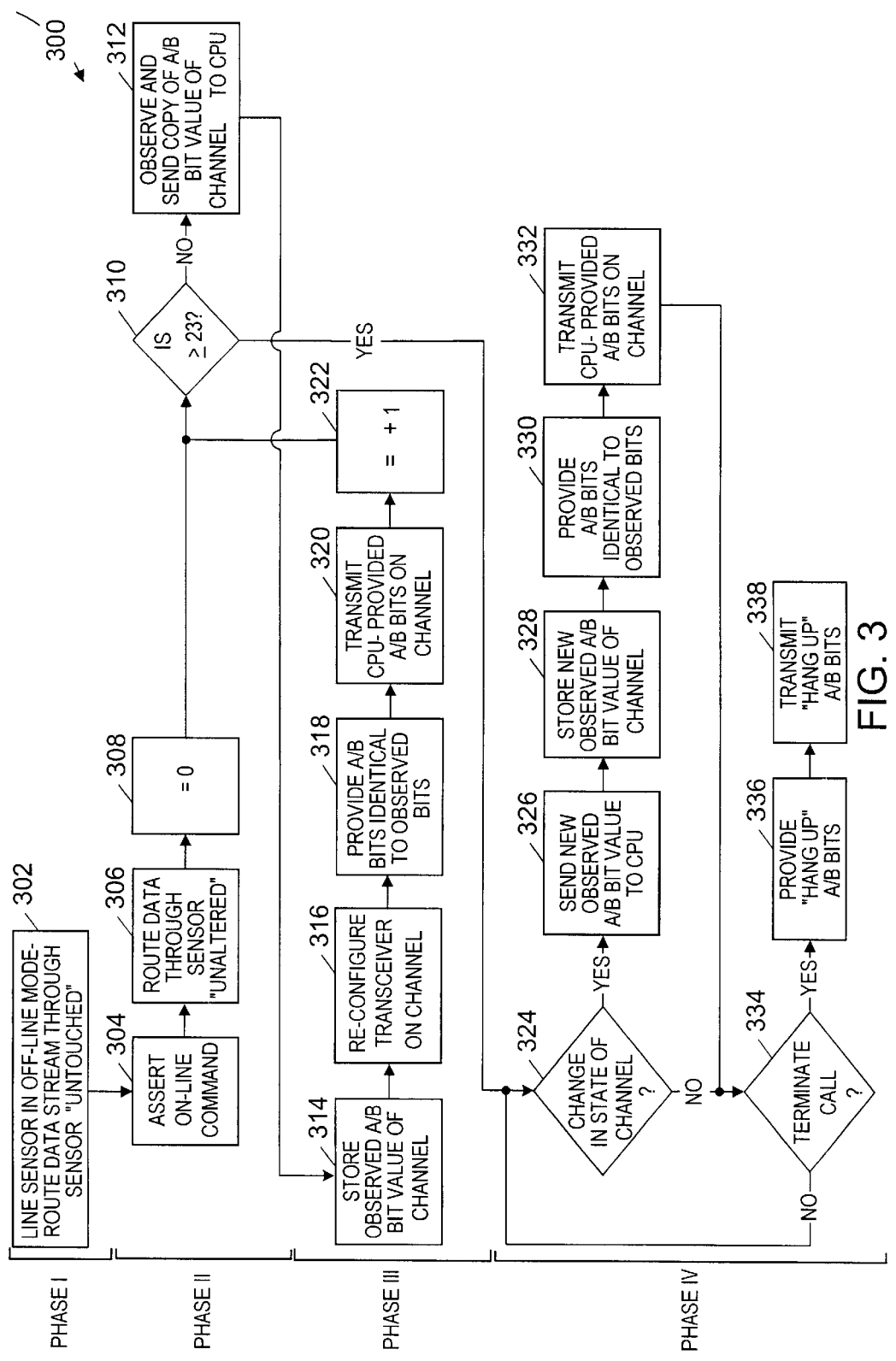

SYSTEM AND METHOD FOR BRINGING AN IN-LINE DEVICE ON-LINE AND ASSUMING CONTROL OF CALLS

CROSS-REFERENCE TO RELATED APPLICATIONS

This application is a continuation-in-part of Ser. No. 09/210,347, now U.S. Pat. No. 6,249,575 entitled TELEPHONY SECURITY SYSTEM filed Dec. 11, 1998, to the same assignee.

TECHNICAL FIELD

The invention relates generally to telecommunications access control systems and more particularly, to a system and method which permits an in-line device to power-up and assume control of calls.

BACKGROUND OF THE INVENTION

A telecommunication firewall, such as the device described in U.S. Pat. No. 6,249,575 entitled TELEPHONY SECURITY SYSTEM is a recently developed device that protects an organization'sdata network from access via telephony resources. Rogue modems installed without the knowledge or authorization of an organization'IT personnel make an organization'sdata network vulnerable to access by unscrupulous persons—both inside and outside the organization—via the Public Switched Telephone Network (PSTN). For example, an incoming modem call to an extension dedicated for only voice or fax use is indicative of a possible hacking attempt or of a rogue modem installed on the extension. Similarly, an outgoing modem call from an extension dedicated for only voice or fax use is indicative of a rogue modem and possible unauthorized activity within the private network. A telecommunications a firewall monitors incoming and outgoing calls via line sensors installed on trunks between the Central Office (CO) and the Private Branch exchange (PBX). The line sensor operates in a continuous loop, examining the data stream and determining call attributes (such as call source, destination and call content-type) as the data stream passes through the line sensor. In accordance with a user defined security policy, the line sensor autonomously denies violating calls and notifies IT personnel for appropriate follow-up.

Once installed, the line sensor signal receiving and transmitting circuitry is in-line with the trunk. When the line sensor switches on-line, it electrically receives and digitally regenerates the data traveling in both the transmit side and the receive side of each communication channel. In order to enforce the security policy, the line sensor must assume control of the data stream on each channel. If the trunk uses Channel Associated Signaling (CAS), gaining control of the call entails gaining control of the A/B bits transmitted between the CO and PBX. CAS uses specific bits of specific subframes to convey line state information that is analogous to "on-hook" and "off-hook". Depending on the protocol used, a bit value of one generally corresponds to off-hook or "loop current flowing", and a bit value of zero generally corresponds to on-hook or "no loop current". It is highly desirous that the line sensor achieves control of the A/B bits in a manner that will not disrupt ongoing A&B signaling, nor confuse the CO or PBX as to the line state, thereby inadvertently causing the call to be dropped.

Unfortunately, when the line sensor comes on-line, the state of the calls on each channel of the trunk is unknown. It is possible to preset the line sensor to transmit a default set of A/B bit values on each channel, but it is difficult to anticipate what the line state on each channel will actually be when the line sensor comes on-line. Calls would be disrupted on any channel whose A/B bit values did not correspond with the present default set of A/B bit values transmitted by the line sensor. It is inevitable that preset default values will be incorrect on some channels, thereby resulting in some percentage of disrupted calls and user inconvenience.

Therefore, what is needed is a system and method whereby an in-line device powers-up and assumes control of calls on a trunk without disrupting ongoing call activity.

SUMMARY OF THE INVENTION

The present invention, accordingly, is a system and method that allows an in-line device to step into the data stream of a communication channel and assume control of the data on a channel in a phased and progressive transition of its hardware and software in a manner so as to be transparent to both the CO and the PBX, and thereby avoid disruption of ongoing call activity.

To this end, in the preferred embodiment, the telecommunications firewall line sensor is installed in-line on the PBX side of the demarcation line. When the line sensor is off-line, all data in each channel of the trunk passes "untouched" through the line sensor so that normal call activity is not affected. When the line sensor switches on-line, the line sensor intercepts and digitally regenerates the data traveling between the CO and PBX. At this time, the line sensor determines the line state (A/B bit value) of each channel on the trunk. As the line state for each channel is determined, the line sensor reconfigures itself and overwrites the A/B bits in the received data with identical A/B bit values in the transmitted data, thereby successfully gaining control of the A/B bits transmitted.

Once the line sensor establishes control over the A/B bits, the line sensor is now capable of either overwriting the transmitted data with identical A/B bits, or of overwriting the transmitted data with altered the A/B bits, whichever is required to enforce the security policy. In other words, if the security policy allows a call, the line sensor overwrites the A/B bits with identical bit values and the regenerated data is identical to the data received. If the line sensor determines a call is in violation of the security policy and the call is to be denied, the line sensor regenerates the received data, but overwrites the A/B bits with bits that will signal to the CO and PBX that the call has ended, thereby terminating the call.

A technical advantage achieves with the invention is the ability for an in-line device to autonomously switch on-line and assume control of ongoing communications on a trunk without disrupting call activity, Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 3 is a flow diagram illustrating the phased and progressive process of the present invention.

DETAILED DESCRIPTION OF THE PREFERRED EMBODIMENTS

The present invention can be described with several examples given below. It is understood, however, that the examples below are not necessarily limitations to the present invention, but are used to describe typical embodiments of operation.

Figure 1:
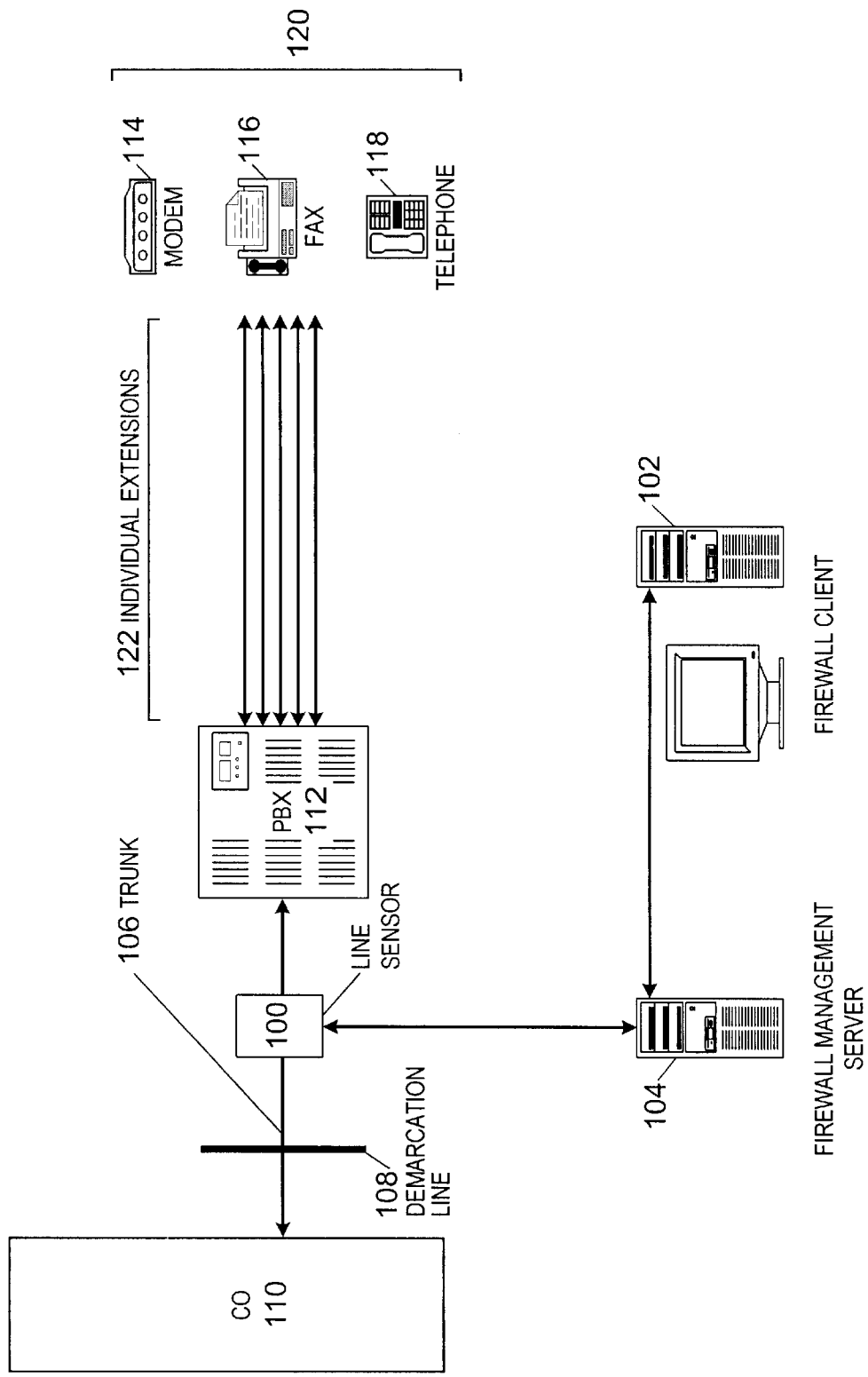
FIG. 1 is a schematic block diagram of an exemplary telecommunications firewall.

FIG. 1 is a schematic block diagram of an exemplary telecommunications firewall, similar to one implemented as shown and described in U.S. Pat. No. 6,249,575, comprising at least one line sensor 100, a firewall client 102, and a firewall management server 104, all electrically connected by a Local Area Network (LAN), a Wide Area Network (WAN) or the Internet for interaction as described below.

The firewall client 102 is the point of user interface whereby the user designs and implements a security policy. The user creates rules that define which calls the line sensor 100 will allow, deny, or otherwise manipulate. The firewall management server 104 receives the security policy from the firewall client 102 and pushes a copy of the security policy to the line sensor 100. The line sensor 100 monitors incoming and outgoing calls, determines call attributes, and allows, denies, or otherwise manipulates each call in accordance with the security policy.

In this embodiment, the line sensor 100 is installed in-series on a trunk 106 that uses Robbed-Bit Signaling (RBS) or some form of CAS. The line sensor 100 is located on the user's side of a demarcation line 108, with interfaces to a Central Office (CO) switch 110 and a Public Branch exchange (PBX) 112.

Also in FIG. 1, numerals 114, 116, and 118 designate end-user stations 120, representing as examples, one or more modems 114, fax machines 116, and telephones 118 which may send or receive calls over the trunk 106. The modems 114 may be connected to a desktop or portable personal computer. Individual extensions 122 connect each of the stations 120 to the PBX 112.

Figure 2:
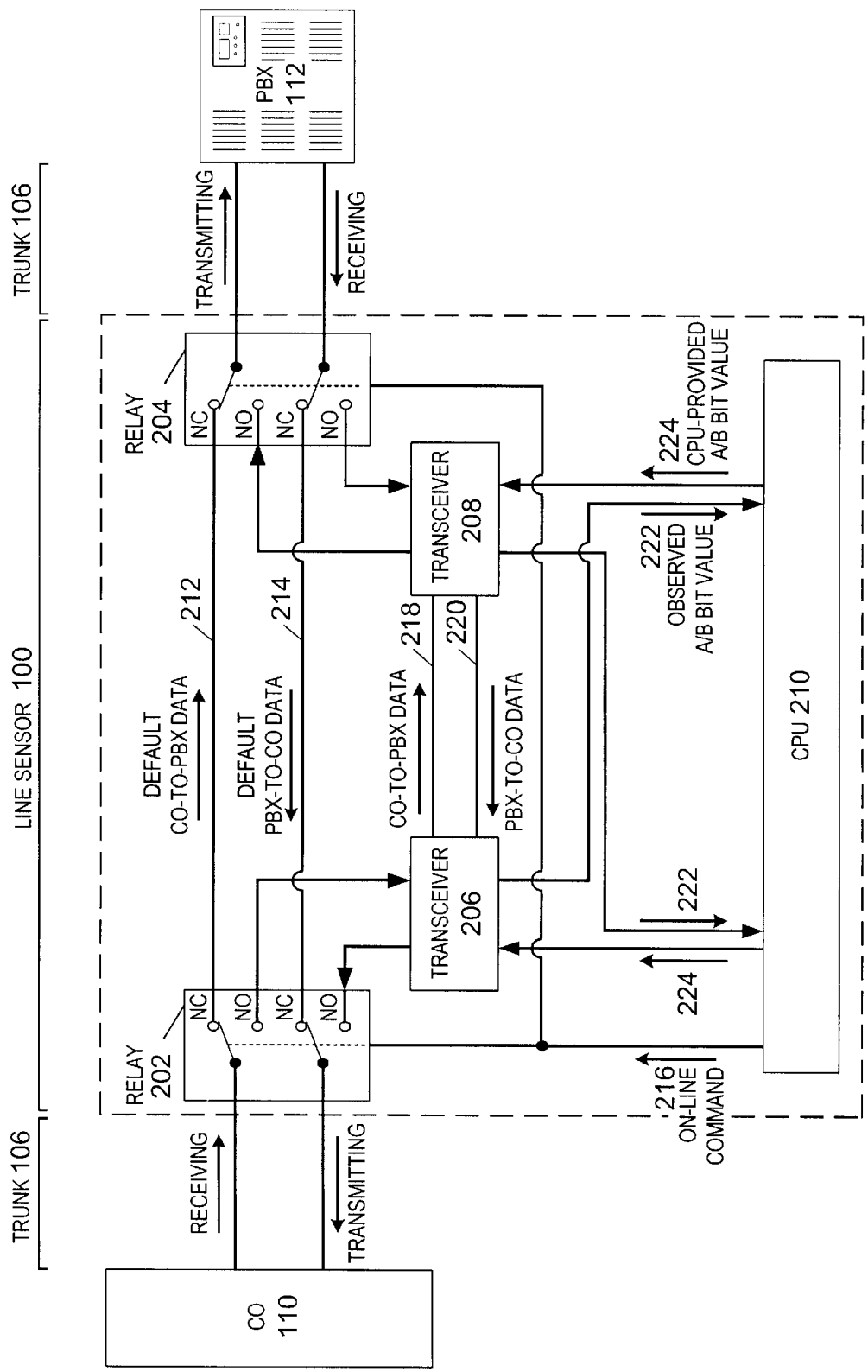
FIG. 2 illustrates a schematic block diagram of the preferred embodiment of the present invention.

Now referring to FIG. 2, for the purposes of this invention, the line sensor 100 consists of relays 202 and 204, transceivers 206 and 208, and a CPU 210. The relays 202 and 204 route the data stream through the line sensor 100. The transceivers 206 and 208 observe and send copies of the A/B bit values in received data to the CPU 210, digitally regenerate received data, and insert appropriate A/B bit values into the transmitted data stream. The CPU 210 executes software that switches the relays, configures the transmitting transceiver, and generates the appropriate A/B bit values for insertion into the transmitted data stream, thus controlling calls in accordance with the security policy.

In the preferred embodiment shown in FIG. 2, when the line sensor 100 is in the off-line mode (such as when the sensor is first installed, powered-off, reset, etc.), the relays 202 and 204 are in the Normally Closed (NC) position and allow the data stream on each channel to pass through the line sensor "untouched" via a default pathway 212 and 214.

FIG. 3 illustrates a process 300 whereby the state of the line sensor 100 hardware and software transitions in a phased and progressive manner to enter the data stream on each channel of the trunk 106 and assume control of each call without disrupting ongoing call activity. In step 302, the line sensor 100 is in the default off-line mode. The relays 202 and 204 are in the Normally Closed (NC) position when the line sensor is in the default off-line mode, so the data stream on each channel of the trunk 106 passes through the line sensor 100 "untouched" via a default pathway 212 and 214. Phase I, neither the transceivers 206 and 208, nor the CPU 210 have access to the data stream.

During Phase II and III, the receiving transceiver (RT) and transmitting transceiver (TT) digitally regenerate the data, including the A/B bit values, thus allowing the data stream to pass "unaltered" through the line sensor 100. Phase II (step 304–314), begins when the CPU 210 asserts an "on-line" command 216 in step 304. The relays 202 and 204 switch to the Normally Open (NO) position and route the data stream for each channel through the transceivers 206 and 208, via a pathway 218 and 220, as described in step 306. The TT regenerates the data, including the A/B bit values exactly as received by the RT. In step 308–322, one channel at a time, (where the letter i represents, for this example, one of the 24 channels on a T1 trunk), a process loop is applied. In step 312, the RT observes the A/B signaling bits on channel i and sends a copy of the bits to the CPU 210, in the form of an observed A/B bit value 222.

Phase III (step 314–322), begins as the CPU 210 stores the observed A/B bit value 222 of channel i in memory, in step 314. In step 316, the CPU 210 configures the TT to receive CPU-provided signaling bits and to insert those bits into the regenerated data on channel i. In step 318, the CPU 210 sends to the TT, a CPU-provided A/B bit value 224, which is identical to the RT-observed A/B bit value 222. In step 320, the TT inserts the CPU-provided A/B bit value 224 into the data stream on channel i and thereby overwrites the A/B bit value in the data stream coming from the RT. The line sensor repeats step 310–322 as the TT inserts the channel-specific CPU-provided A/B bit value 224 into the data stream on each channel i. Since the A/B bit value 224 the TT inserts is identical to the observed A/B bit value 222 sent to the CPU 210 by the RT in this phase, ongoing call activity is not disrupted.

Phase IV (step 324–338), is outside the scope of this invention, is now discussed to further demonstrate the purpose and value of this invention. Having successfully entered the data stream and progressively assumed control of call activity in Phase I–III, the line sensor 100 is able to exert its control to deny inbound and outbound calls, as well as terminate calls in-progress in accordance with the user-defined security policy by overwriting the A/B bit values as necessary.

In step 324, the RT continues to monitor the signaling information on each channel, and sends a copy of any change in the observed state to the CPU 210 as long as the line sensor 100 remains in the on-line mode. If the A/B bit value changes, the RT sends a new observed A/B bit value 222 to the CPU 210 in step 326. The CPU stores the new state in step 328 and immediately sends a corresponding and identical CPU-provided A/B bit value 224 to the TT to insert into the data stream in step 330. If the call is to be allowed, the CPU-provided A/B bit value 224 corresponds to the observed A/B bit value 222. Until it receives new A/B bit values from the CPU 210, the TT inserts the most recently provided A/B bit values.

If the call is determined to violate the security policy in step 334, the CPU provides to the TT, the new A/B bit value 224 that correspond to a "hang up" state, in step 336. In step 338, the TT overwrites the A/B bits in the data it regenerates with the CPU-provided A/B bit value 224 that correspond to a "hang up" state, thereby terminating the call.

It is understood that the present invention can take many forms and embodiments. The embodiments shown herein are intended to illustrate rather than to limit the invention, it being appreciated that variations may be made without departing from the spirit of the scope of the invention. For example, this invention can be used for a plurality of telecommunications trunk-types. Some examples are T1, E1 and J1 that use Channel Associated Signaling (CAS) and Robbed Bit Signaling (RBS). The algorithms and process functions performed by the invention may be organized into any number of different modules or computer programs for operation on one or more processors or workstations separate from the line sensor.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A telephony security system for controlling and logging call access between an enterprise'send-user stations at a plurality of customer sites and their respective circuits into the public switched telephone network (PSTN), comprising:
   a discrete line sensor within the customer sites for determining a call type of the call, wherein said discrete line sensor does not interfere with existing communications;
   a public branch exchange (PBX) within the customer sites connected to the line sensor;
   a central office switch connected to said discrete line sensor and the PBX; and
   a firewall management server connected to said discrete line sensor.

2. The system of claim 1 wherein said discrete line sensor determines whether the call-type is one of voice, fax or data (modem), and applies security rules which permit or deny a call.

3. The system of claim 2 wherein said security rules specify one or more actions to be taken, said one or more actions being selected from a group including: redirecting the call, logging the call, providing an alert, said alert being selected from a group including: electronic mail notification, pager dialing, console messaging, and a simple network management protocol (SNMP) trap.

4. The system of claim 1 wherein said discrete line sensor determines one or more other call attributes, said one or more other call attributes being selected from a group including: call-type, call date, call time, call duration (in seconds), station extension, inbound number, and outbound number dialed.

5. A method for controlling and logging call access between an enterprise'send-user stations at a plurality of customer sites and their respective circuits to the public switched telephone network (PSTN), said method comprising the steps of:
   discretely sensing the type of call line by lines within the customer sites wherein said step of discretely sensing the type of call does not interfere with existing communications and further includes:
      routing data through a line sensor without altering the data;
      routing said data through said line sensor by storing and copying said data; and
      transmitting new data through said line sensor.

6. The method of claim 5 wherein of said type of the call is one of voice, fax or data (modem), and wherein security rules specify the actions of permitting or denying a call based on the type of call sensed.

7. The method of claim 6 further including the step of sensing one or more other call attributes wherein said one or more call attributes are selected from a group including: call date, call time, call duration (in seconds), station extension, inbound number, and outbound number dialed.

8. The method of claim 6 wherein said security rules specify one or more actions to be taken, said one or more actions being selected from a group including redirecting the call, logging the call, and providing an alert, said alert being selected from a group including: electronic mail notification, pager dialing, console messaging, and a simple network management protocol (SNMP) trap.

9. A telephony security system for controlling and logging call access between an enterprise'send-user stations at a plurality of customer sites and their respective circuits into the public switched telephone network (PSTN) comprising:
   a discrete line sensor within the customer sites for determining a call type of the call, wherein said discrete line sensor does not interfere with existing communications and wherein said discrete line sensor includes:
      a pair of relays for routing data through said line sensor without altering the data;
      a pair of transceivers and a processing unit for routing data through said discrete line sensor by storing and copying the data and for transmitting new data through said discrete line sensor;
   a public branch exchange within the customer sites connected to said discrete line sensor;
   a central office switch connected to said discrete line sensor and the public branch exchange; and
   a firewall management server connected to said discrete line sensor.

10. The system of claim 9 wherein said discrete line sensor includes means for performing actions on selected calls.

11. The system of claim 10 further including a remote log server for logging all access to each of the end-user stations and any actions taken on each of the end user stations.

12. The system of claim 9 wherein said discrete line sensor determines whether the call-type is voice, fax or data (modem), and applies security rules which permit or deny a call.

13. The system of claim 12 wherein said security rules specify one or more actions to be taken, said one or more actions being selected from a group including: redirecting the call, logging the call, and providing an alert, whereby said alert being selected from a group including: electronic mail notification, pager dialing, console messaging, and a simple network management protocol (SNMP) trap.

14. The system of claim 9 wherein said discrete line sensor determines one or more other call attributes said one or more other call attributes being selected from a group including: call date, call time, call duration (in seconds), station extension, inbound number, and outbound number dialed.

15. The system of claim 9 further including a remote management station connected to said discrete line sensor, said remote management station constructed and arranged to contain a database of security rules and to download a subset of said security rules to said discrete line sensor.

16. The system of claim 9 wherein the telephony security system is constructed and arranged for installation on the enterprise side of a local telephony company's central office.

17. The system of claim 9 wherein said discrete line sensor is placed between the end-user station and a telephony company's central office.

* * * * *